United States Patent [19]
Radley et al.

[11] Patent Number: 5,656,876
[45] Date of Patent: Aug. 12, 1997

[54] BATTERY PACK

[75] Inventors: Stephen Radley, Basingstoke; Peter Karsten, Windsor; Guy Hooker, Camberley, all of England

[73] Assignee: Nokia Mobile Phones Limited, Salo, Finland

[21] Appl. No.: 558,864

[22] Filed: Nov. 15, 1995

Related U.S. Application Data

[63] Continuation of Ser. No. 121,188, Sep. 14, 1993, abandoned.

[30] Foreign Application Priority Data

Sep. 21, 1992 [GB] United Kingdom .................. 9219922

[51] Int. Cl.$^6$ .................................................. H02J 7/00
[52] U.S. Cl. .......................... 307/150; 174/35 R; 361/816; 320/2
[58] Field of Search .............................. 307/89, 91, 104, 307/150, 151; 320/2, 14; 361/816, 818; 174/35 R, 35 MS, 32

[56] References Cited

U.S. PATENT DOCUMENTS

| | | | |
|---|---|---|---|
| 3,963,975 | 6/1976 | Gauper, Jr. et al. | 307/91 |
| 4,121,115 | 10/1978 | de Mere | 307/150 |
| 4,426,587 | 1/1984 | Nouet | 307/66 |
| 4,453,110 | 6/1984 | Iwamoto et al. | 315/241 P |
| 4,563,627 | 1/1986 | Orban | 320/19 |
| 5,006,881 | 4/1991 | Kodama | 354/484 |
| 5,164,542 | 11/1992 | Hart | 174/35 MS |
| 5,204,608 | 4/1993 | Koenck | 307/150 |
| 5,218,188 | 6/1993 | Hanson | 235/375 |
| 5,218,284 | 6/1993 | Burns et al. | 320/14 |

FOREIGN PATENT DOCUMENTS

| | | |
|---|---|---|
| 2040609 | 8/1980 | United Kingdom . |
| WO 82/04355 | 12/1982 | WIPO . |
| WO 91/07002 | 5/1991 | WIPO . |

OTHER PUBLICATIONS

Patent Abstracts Of Japan, vol. 11, No. 359 (E–559), Nov. 21, 1987 for JP62 133680 "Battery Pack" by Hakuta Tatsuo.
Patent Abstracts Of Japan, vol. 11, No. 154 (E–508), May 19, 1987 for JP61 292450 "Portable Telephone Set" by Konomura Naomitsu.

*Primary Examiner*—William M. Shoop, Jr.
*Assistant Examiner*—Jonathan S. Kaplan
*Attorney, Agent, or Firm*—Perman & Green

[57] ABSTRACT

A battery pack (4) comprises a stack of lithium solid state cells (1) and a DC/DC converter (2) in a housing (3), for use in supplying current to an electronic apparatus, e.g. a portable telephone. This provides a stable voltage for operating the electronic apparatus as the cells become progressively more discharged without having to include a DC/DC converter in the apparatus itself. The battery pack (4) can be arranged to supply current directly from the cells (1) as well as via the DC/DC converter (2), and the DC/DC converter (2) can be made voltage controllable to supply different voltages depending upon requirements. Conductive screening around the battery pack can be provided to prevent electromagnetic interference from the DC/DC converter (2).

9 Claims, 2 Drawing Sheets

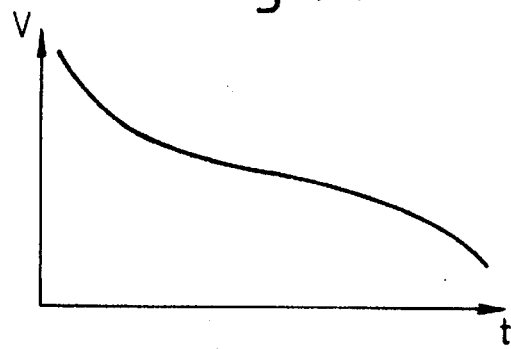
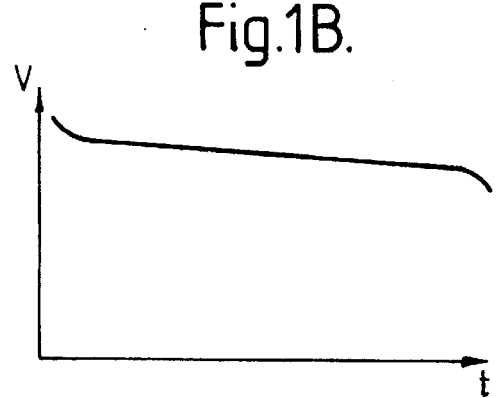
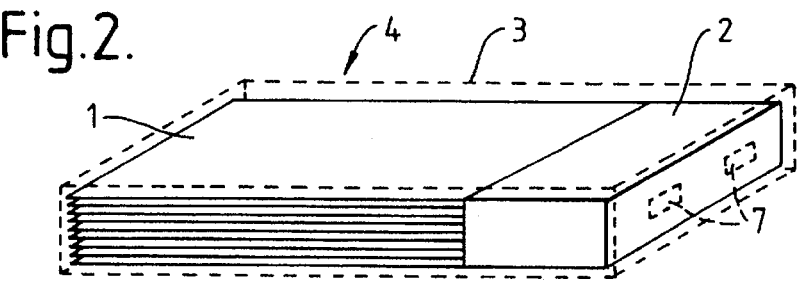
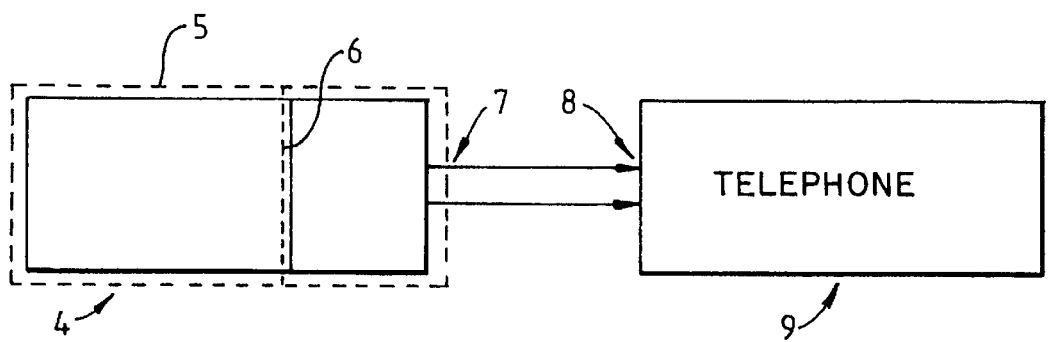

BATTERY PACK

CROSS-REFERENCE TO RELATED APPLICATION

This is a continuation patent application of application Ser. No. 08/121,188 filed 09/14/93, now abandoned.

FIELD OF THE INVENTION

This invention relates to an electrical power supply for an electrical apparatus particularly, but not exclusively, a hand-held portable radio telephone, hereinafter referred to as a portable telephone.

DESCRIPTION OF THE BACKGROUND OF THE INVENTION

Portable telephones, as with other portable electrical apparatus operate from an internal, removable, power supply generally in the form of a rechargeable battery pack. Typically, the battery pack may comprise six nickel cadmium (NiCd) cells.

Work is continuously being carried out in developing new cells for battery packs, which provide smaller, more lightweight, more efficient and generally more versatile power supplies. Recently developed cells use a polymer electrolyte. One such cell is called a Lithium Solid State (LSS) cell.

LSS cells typically are of a layered structure comprising a lithium metal electrode, a polymer electrolyte, a carbon collector, and, a metallic electrode, for example, of aluminium or nickel foil. This layered structure is, typically, of the order of less than 1 mm thickness. To provide the required voltage output, a number of the layered structures—in the form of rectangular sheets—may be stacked and suitably interconnected. LSS cells are described in Electronics Times, Power Special Report, 16 Jul. 1992, pages 21–22. LSS cells have the advantage of being lightweight, small and rechargeable time after time, and, because they are in the form of very thin laminated structures can be designed into virtually any shape.

Despite these advantages, one drawback is that their voltage output is proportional to the charge remaining i.e. they exhibit a noticeable voltage drop during use, which makes them not entirely suitable for use in portable electrical apparatus. For example, a two cell battery will have an output of around 6.3 V at full charge and a 3.8 V output when discharged, but between these points, the output drops noticeably over time as shown in FIG. 1A. The discharge rate is generally linear, the exact rate being dependant upon the load coupled to the battery. This is unlike a conventional NiCd battery which exhibits an initial sharp voltage drop, with a substantially more constant voltage output thereafter until, at discharge, there is another sharp drop in output voltage.

To overcome the problem exhibited by LSS batteries, a Direct Current-to-Direct Current (DC/DC) conversion system could be provided in the electrical apparatus to provide a stable output voltage before it is supplied to the electronic circuitry of the apparatus. FIG. 1B shows how the voltage output from an LSS battery can be stabilized as a function of time by providing such a DC/DC conversion system. However, this has the problem of electromagnetic interference (EMI), i.e. the electromagnetic radiation emitted by the DC/DC converter that "disturbs" other circuitry in the apparatus e.g. the radio frequency (RF) section of a telephone's electronic circuitry.

In addition, providing a DC/DC converter in the apparatus is an additional cost when it may not be needed, for example, if the apparatus is also capable of using a conventional NiCd battery as its power source. It also means that LSS battery cannot be used in "older" apparatus which do not have a DC/DC converter.

SUMMARY OF THE INVENTION

According to the present invention, there is provided a battery pack for coupling to an electronic apparatus for supplying a current thereto, the battery pack comprising a housing enclosing a plurality of cells providing the current supply for the electronic apparatus therein, and means coupled to the cells for maintaining a substantially uniform voltage output therefrom as the charge state of the cells diminishes, the voltage maintaining means being present within said housing.

This has the advantage, that by locating the voltage stabilizing means in the battery pack, the battery will itself supply a constant voltage even when LSS cells are used. The battery may also have the advantages of LSS cells e.g. that it is lightweight, more compact, and configurable into virtually any shape required. Thus, a battery pack can readily be made to the same shape as an existing battery pack for a known apparatus to enable it to be retrofitted to pre-existing apparatus.

The voltage stabilizing means may be provided within and electrically conductive screen disposed on the battery housing.

This has the advantage that because the voltage stabilising means is located at a distance from other circuitry in the apparatus (i.e. it is in the battery pack), and because an electrically conductive screen is provided then the effect of EMI within the apparatus is reduced or eliminated.

BRIEF DESCRIPTION OF THE DRAWINGS

FIGS. 1A and 1B are illustrative graphs of output voltage of a lithium solid state battery pack as a function of time without and with a DC/DC conversion unit respectively;

FIG. 2 is a schematic diagram illustrating the interior of battery pack according to the invention;

FIG. 3 is a schematic representation of the battery of FIG. 1, illustrating its connections to a telephone;

Figure 4:
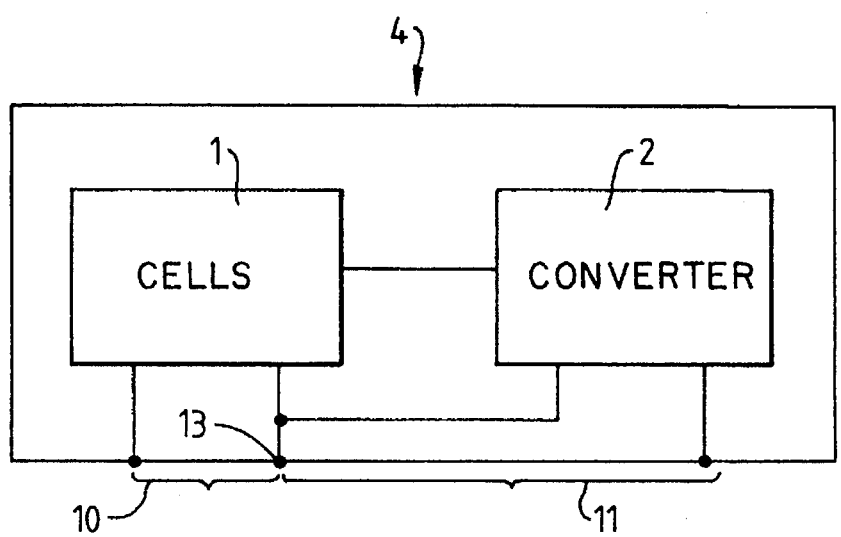
FIG. 4 is a schematic representation of a second embodiment of the invention.

In the following description, an embodiment of the invention will be described byway of example only and as designed for use with a known portable radio telephone.

A battery pack 4 in accordance with the invention, has a number of LSS cells 1 and a DC/DC converter 2. As discussed above, a DC/DC converter 2 maintains a substantially uniform voltage output from the LSS cells 1 as the charge state of the cells diminishes. Preferably, the cells 1 and the DC/DC converter 2 are arranged in a housing 3—illustrated by the broken lines in FIG. 2—to form a battery pack 4 of the required shape. In the example shown in FIG. 2, the battery pack 4 has a substantially rectangular configuration. The battery pack 4 can be formed to resemble a conventional, known battery pack to allow it to be retrofited into pre-existing apparatus. The LSS bells 1 are arranged in a stack of, for example, 3 sets of LSS cells, each set of LSS cells comprising a stack of three to five of the rectangular sheets described in the opening paragraphs above, the sets being connected in series. Each LSS cell of each set will be connected in parallel. The DC/DC converter 2 is located adjacent the LSS cells at one end as illustrated in FIG. 2. Typically, a DC/DC converter would have the dimensions of 40 mm×10 mm×5 mm and the stack of LSS cells 1 the dimensions of 40 mm×50 mm×5 mm.

DC/DC converters are, in themselves, well known. DC/DC converters are, in effect, high frequency transformers which use, for example, transistors to step-up the voltage output from a voltage source where the output voltage decreases or varies over time to provide a stable output voltage, whatever the actual output voltage supplied by the voltage source. The DC/DC converter 2 can be connected to the LSS cells 1 in any manner well known to a person skilled in the art.

The cells 1, and the DC/DC converter 2 are provided within a shield 5 to reduce EMI. This shielding is provided in the form of an electrically conductive coating on the internal surface of the battery housing.

The shield 5 can be provided around the whole of the battery pack 4, with additional shielding 6 at the boundary between the DC/DC converter 2 and the cells 1 to provide separate shielding for both the DC/DC converter 2 and the cells 1. Alternatively partial shielding can be provided to shield the DC/DC converter 2 only.

For use with a portable radio telephone 9, the whole battery pack 4 is provided with two output terminals 7 for connection with respective inputs 8 in the telephone 9 for supplying current to the telephone's conventional electronic circuitry including a processor (not shown) provided for operating the telephone, and implementing the various functions.

In a second embodiment of the invention illustrated in FIG. 4, the battery pack 4 can be provided with two sets of output terminals 10, 11, sharing a common terminal 13. The first pair of outputs 10 supplies current directly from the LSS cells 1 and the second pair 11 supplies current via the DC/DC converter 2.

The voltage from the first output pair 10 will be higher, but less stable, than the voltage from the second output pair 11.

The second output pair 11 provides a lower, but more stable, output voltage than the voltage from the first output pair 10, which is preferably applied to those parts of the telephone's electronic circuitry requiring a lower current e.g. the baseband.

While providing a stable current output is preferable, the less stable, but higher, voltage output from the first output pair 10 may be adequate for those parts of the telephone 9 requiring a larger voltage e.g. the power amplifier (PA).

As is well known, the portable radio telephone 9 can, at times, operate at a lower voltage than at other times. For example, when a telephone is operating in a "stand-by" mode i.e. when a telephone is not being used for either making or receiving a call, a lower operating voltage is required than when the telephone is in "call" mode i.e. when receiving and making a call.

Figure 5:
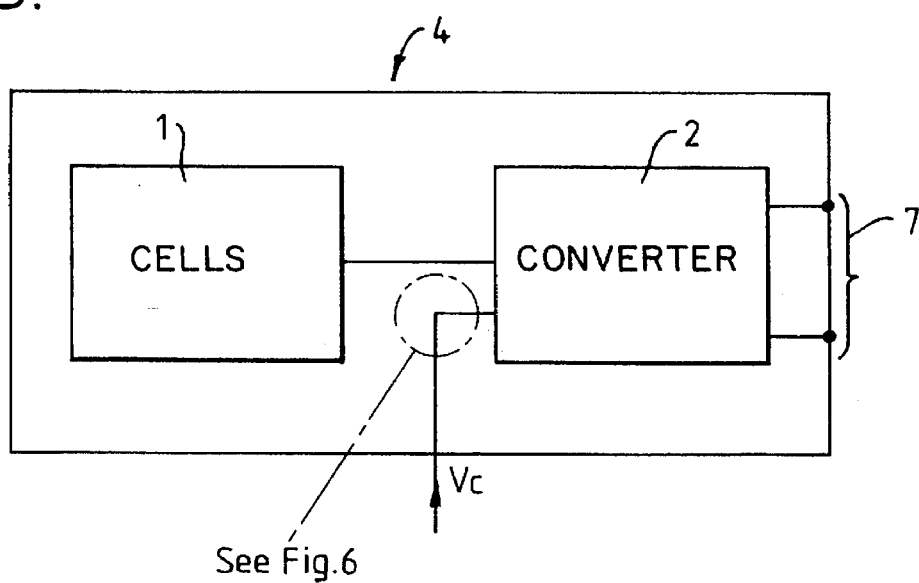
FIG. 5 is a schematic representation of a third embodiment of the invention.
Figure 6:
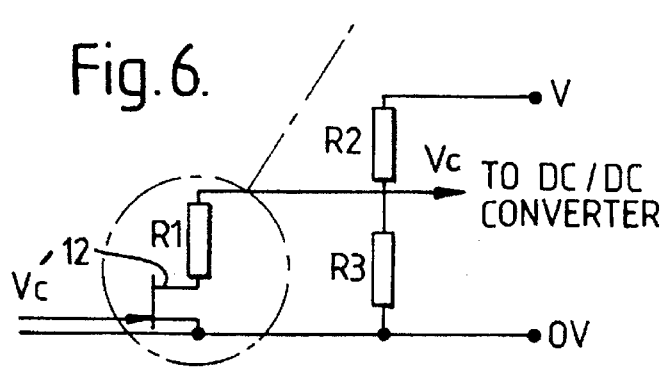
FIG. 6 is a schematic diagram for supply of a control voltage to the battery pack for controlling the output voltage thereof.

In a third embodiment, illustrated in FIGS. 5 and 6 the DC/DC converter 2 can be made voltage controllable so as to provide different output voltages from the output of the DC/DC converter 2 depending upon the requirements of the telephone e.g. depending upon whether the telephone is in "stand-by" or "call" mode.

The appropriate output voltage is selected by supplying a control voltage Vc to the DC/DC converter 2 from the telephone under control of the telephone's microprocessor.

A first control voltage V'c from the telephone's microprocessor is supplied to an FET 12, connected between power supply V and ground OV, to provide an output control voltage Vc out which is switchable between 3 V and 5 V, for example, under control of the first control voltage V'c as shown in FIG. 6.

The drain of the FET 12 is coupled via a resistor R1 to the common node of two series-coupled resistors R2, R3. The first control voltage V'c places the FET 12 in either a conducting or non-conducting state, such that the appropriate 3 V or 5 V output control voltage Vc is coupled to the DC/DC converter 2.

It will be evident, from the foregoing description, to a person skilled in the art, that various modifications are possible, within the scope of the present invention. For example, a linear regulator could be provided in addition to the DC/DC converter. In this case, means can be provided to control whether the current is supplied through the DC/DC converter or the linear regulator depending upon which is the most efficient. Typically linear regulators are used when there is a low current requirement and the DC/DC converter where there is a high-power requirement.

In addition, a battery pack could be provided which not only supplies two different voltages to different parts of the telephone's electronic circuitry, but has the means for switching the voltage input from the DC/DC converter between two selected values under control of a control voltage i.e. a battery pack having both the features of the second and third embodiments.

Although an embodiment of the invention has been described in relation to a battery designed for a radio telephone, a battery pack could be designed, in accordance with the present invention, for use with other electrical apparatus.

What we claim is:

1. A radio telephone battery pack comprising a housing suitably configured to be connected to a radio telephone, said housing enclosing a plurality of cells providing the current supply for said radio telephone, and means coupled to said cells for maintaining a substantially uniform voltage output therefrom as the charge state of said cells diminishes, a voltage maintaining means being present within said housing wherein said battery pack is provided with an electrically conductive screen around the whole of said voltage maintaining means to shield external circuitry from electromagnetic interference from the voltage maintaining means and, wherein the screen is disposed on the housing and an additional electrically conductive screen is provided between the cells and the voltage maintaining means.

2. A battery pack as set forth in claim 1 wherein said battery pack is provided with the electrically conductive screen around the whole of said cells.

3. A battery pack as set forth in claim 1 comprising means for supplying current directly from said cells in addition to said voltage maintaining means.

4. A battery pack as set forth in claim 1 comprising means for supplying a selected predetermined voltage from said voltage maintaining means in response to said radio telephone, from more than one selectable voltage levels in response to a control signal.

5. A battery pack as set forth in claim 1 wherein said cells comprise a plurality of polymer electrolyte cells.

6. A battery pack as set forth in claim 1 wherein said voltage maintaining means is a DC/DC converter.

7. A radio telephone and battery pack assembly comprising:

a radio telephone having electrical power supply input terminals; and a battery pack having a housing, electrical power output terminals connected to the input terminals of the radio telephone, a plurality of cells, means coupled between the cells and the output terminals for maintaining a uniform voltage output from the cells as the charge state of the cells diminishes, an electrically conductive shield around the means for maintaining to shield circuitry in the radio telephone from electromagnetic interference from the means for maintaining, and means for supplying current directly from the cells to the output terminals in addition to the means for maintaining.

8. A radio telephone battery pack for coupling to a radio telephone for supplying a current thereto, said battery pack comprising a housing suitably configured to be connected to said radio telephone, output terminals, a plurality of cells located in the housing for providing the current supply for said radio telephone, means coupled between said cells and said output terminals for maintaining a substantially uniform voltage output from said cells as the charge state of said cells diminishes, and means for supplying current directly from said cells to said output terminals in addition to supplying current from said voltage maintaining means to said output terminals, wherein said battery pack is provided with an electrically conductive screen around said voltage maintaining means to shield external circuitry from electromagnetic interference from the voltage maintaining means and, wherein the screen is disposed on the housing and an additional electrically conductive screen is provided between the cells and the voltage maintaining means.

9. A battery pack for coupling to an electronic apparatus and supplying a current thereto, said battery pack comprising a housing enclosing a plurality of cells for providing the current for said electronic apparatus, means coupled to said cells for maintaining a substantially uniform voltage output therefrom as the charge state of said cells diminishes, an electrically conductive screen around said voltage maintaining means to shield external circuitry from electromagnetic interference from the voltage maintaining means, means for supplying a selected predetermined voltage from said voltage maintaining means, in response to a control signal from said electronic apparatus, from multiple selectable predetermined voltage levels, output terminals on the housing, and means for supplying current directly from the cells to in output terminals in addition to the means for maintaining.

* * * * *